United States Patent [19]
Osuna-Diaz

[11] Patent Number: 5,078,589
[45] Date of Patent: Jan. 7, 1992

[54] MULTICAVITY INJECTION MOLDING APPARATUS HAVING PRECISION ADJUSTMENT AND SHUT OFF OF INJECTION FLOW TO INDIVIDUAL MOLD CAVITIES

[76] Inventor: J. M. Osuna-Diaz, 2365 Avon Industrial Dr., Rochester Hills, Mich. 48309

[21] Appl. No.: 538,522

[22] Filed: Jun. 15, 1990

[51] Int. Cl.⁵ ............................................. B29C 45/23
[52] U.S. Cl. ................................ 425/562; 264/297.2; 264/328.9; 425/564; 425/566; 425/570; 425/588
[58] Field of Search ............................ 137/614, 637.2; 425/549, 562, 564, 566, 570, 573, 588; 264/297.2, 328.8, 328.9

[56] References Cited

U.S. PATENT DOCUMENTS

| | | | |
|---|---|---|---|
| 4,279,582 | 7/1981 | Osuna-Diaz | 425/549 |
| 4,330,258 | 5/1982 | Gellert | 425/564 |
| 4,378,963 | 4/1983 | Schouenberg | 425/564 |
| 4,592,711 | 6/1986 | Capy | 425/562 |
| 4,669,971 | 6/1987 | Gellert | 425/549 |
| 4,786,246 | 11/1988 | Gellert | 425/549 |
| 4,917,594 | 4/1990 | Gellert et al. | 425/566 |
| 4,923,387 | 5/1990 | Gellert | 425/566 |

Primary Examiner—Timothy Heitbrink
Attorney, Agent, or Firm—John R. Benefiel

[57] ABSTRACT

An arrangement is disclosed for independently controlling shutoff and flow to a cavity gate in a multicavity injection mold apparatus, in which a plurality of valve pins are mounted to a movable holder plate, each aligned with a cavity gate and movable thereinto to control shutoff and a plurality of fixed position plunger sleeves are each mounted over a respective valve pin and adjustably positioned with respect to a restriction feature in the supply passage upstream of the associated gate.

7 Claims, 2 Drawing Sheets

MULTICAVITY INJECTION MOLDING APPARATUS HAVING PRECISION ADJUSTMENT AND SHUT OFF OF INJECTION FLOW TO INDIVIDUAL MOLD CAVITIES

This invention concerns injection molding apparatus and processes and more particularly multicavity injection molds in which a number of closely spaced cavities are included in a single mold.

Injection molds sometimes include a shut off at each gate to achieve perfect flow control at the gate so that a mark is not left on the molded part at the point of injection from excess material. This shutoff typically comprised of a valve pin moving into the gate at shutoff, the valve pin driven by a power cylinder either directly or via a pivoted lever.

In a multicavity mold with closely spaced cavities, it becomes impractical to fit the cylinders required into the small space provided.

U.S. Pat. No. 4,378,963 issued on Apr. 5, 1983 for "Injection Mechanism for Molding Plastics" describes an arrangement where a plurality of valve pins are adjustably mounted to a single piston. This results in a complex piston design, and practical limitations as to the size of the piston limit the number of cavities possible in such a molding apparatus.

It is also desirable to be able to individually control the volume of flow of melt to each cavity, since uneven flow may sometimes occur as where there is unequal runner lengths, or other local conditions creating variations in flow restrictions.

U.S. Pat. No. 4,279,582 issued on July 21, 1981 for "Method and Apparatus for Individual Control of Injection Mold Shutoff Bushings" describes a system for timing the shutoff of each individual valve pin by an electronic control system for a plurality of hydraulic cylinders each operating a valve pin. This approach adds considerable cost and complexity to the apparatus.

U.S. Pat. No. 4,592,711 describes a combined valve pin and dosage sleeve for individual mold cavities, but this arrangement is not adapted for simultaneous actuation of a number of devices for a multicavity mold.

In copending application Ser. No. 07/177,919 filed on Oct. 21, 1988 by the present inventor, there is described a flow adjustment means comprised of a pin disposed in a convergent restriction immediately upstream of the gate, the lengthwise position of the pin externally adjustable to vary the restrictive effect of the pin and hence the flow rate to the associated cavity. A shutoff is not provided in that design.

SUMMARY OF THE INVENTION

The present invention provides an apparatus and process for providing a shutoff valve pin for each gate in a multicavity mold even for closely spaced gates, and additionally allows for individual adjustment of the flow rate to each cavity.

A separate valve pin holder plate is provided carrying an array of valve pins each extending into a respective gate. The valve pin holder plate is vertically movable, two or more power cylinders mounted to a side the of mold structure and connected to a projecting edge of the holder plate so that the power cylinders can raise and lower all of the valve pins simultaneously. The valve pins are each individually threadably received in holders carried by the holder plate so as to be able to be accurately positioned to be fully closed with the cylinders retracted. the fully power being advanced or retracted in their respective holders. The position of each valve pin can be individually adjusted by being advanced or retracted in their respective holders to insure that all of the valve pins will be fully closed when the power cylinders are retracted.

Also included is a flow adjusting plunger sleeve received over each valve pin and having a tapered end positioned in a tapered seat formed in the injector nozzle upstream from the gate. The plunger sleeve is threaded into a plunger sleeve holder, carried in a plunger sleeve support plate located beneath the valve pin holder plate. The plunger sleeves are each individually axially adjustable in their respective holders so as to allow adjustment of the restrictive effect of the clearance with the tapered seat, and thus the individual flow rate to each cavity.

Accordingly, both gate shutoff and individual flow rate adjustment are provided for nozzles for multicavity molds, even if the nozzles are closely spaced together.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
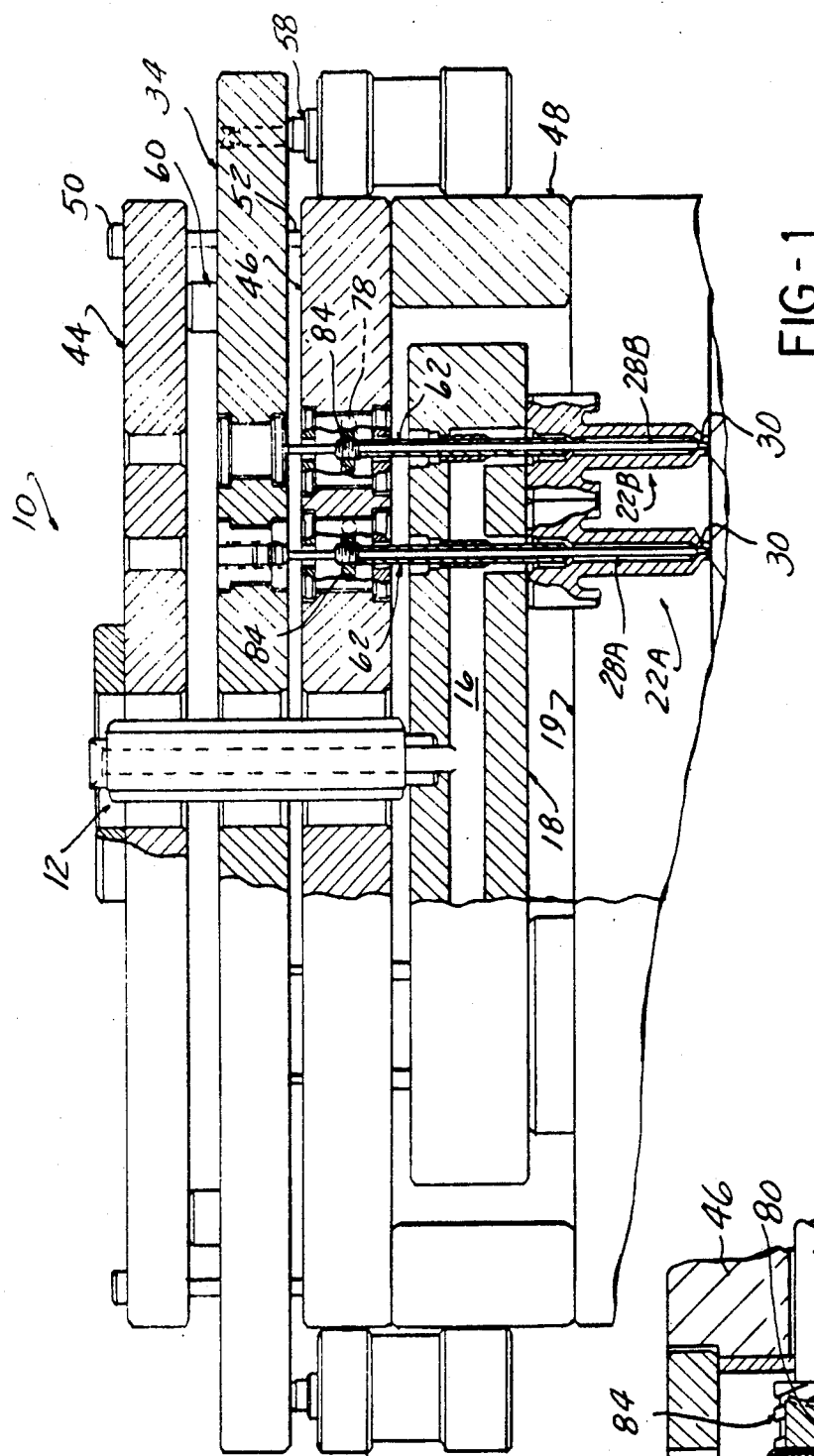
FIG. 1 is a front elevational view in partial section of the upper cavity portion of an injection mold apparatus incorporating the present invention.
Figure 2:
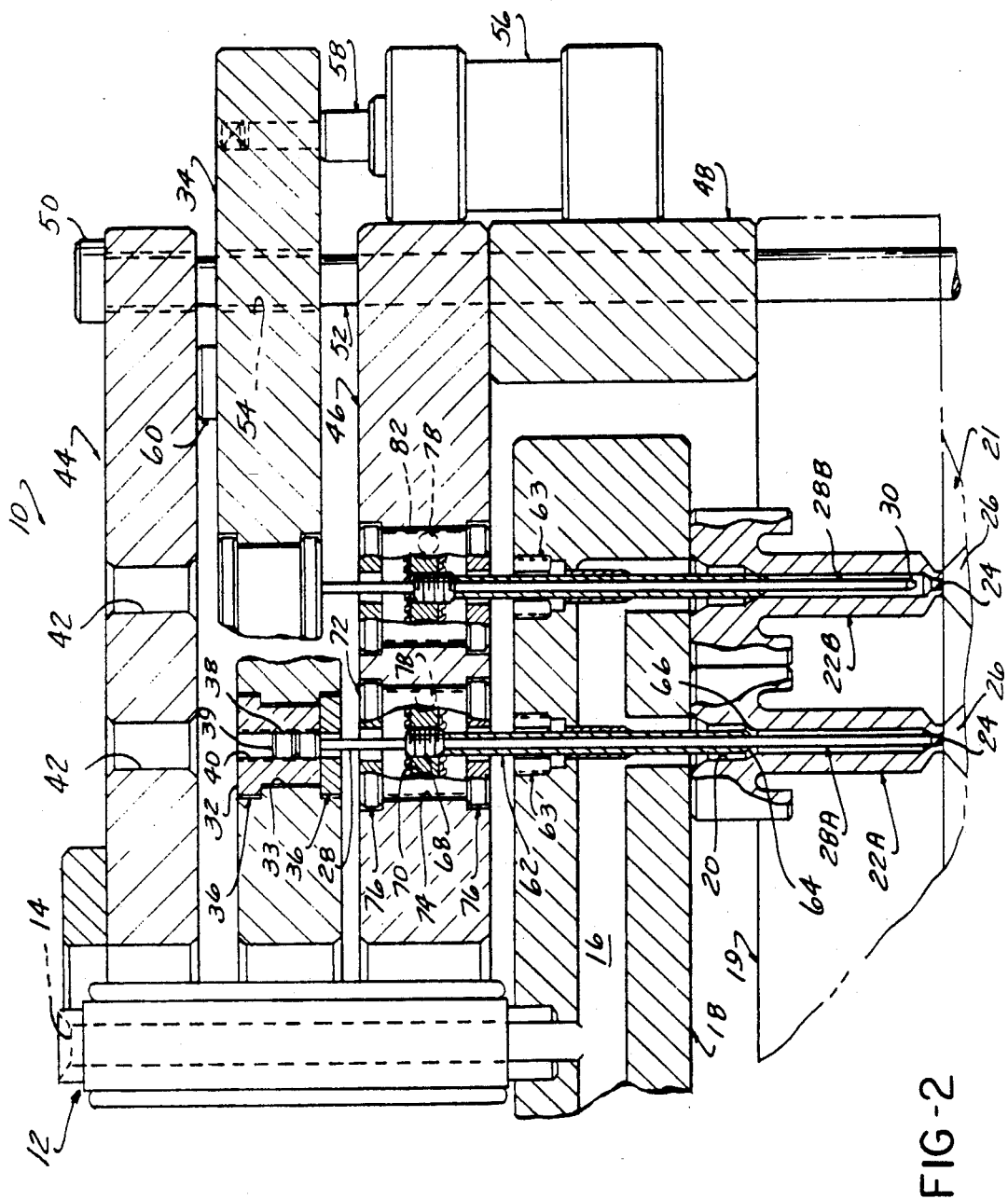
FIG. 2 is an enlarged view of a portion of the apparatus shown in FIG. 1, shown with the valve pin and plunger sleeves in axially shifted positions in respective injection nozzles shown on the right and left side of the view.

Referring to FIGS. 1 and 2, the mold assembly 10 includes a heater surrounded extension nozzle 12 having a sprue 14 for receiving hot melt from an injection machine (not shown) and directing the same to runner passages 16 in a manifold plate 18. Runner passages 16 communicate with bores 20 in each of an array of injection nozzles 22A,22B mounted in the cavity plate 19. Each injection nozzle 22A,22B has a tapered gate 24 aligned with a respective mold cavity 26 formed in core plate 21.

A valve pin 28A,28B within each bore 20, having a tapered end 30 configured to be fit within a respective gate 24. The valve pins 28A,28B each extend upwardly into an associated valve pin holder 32 carried in a holder plate 34.

Each holder 32 is received in suitable bores 33 in the holder plate 34 with radial clearance therebetween allowing limited lateral movement to allow alignment of each valve pin 28 with the associated gate 24. Hub portions 36 locate the valve pin holder 32 radially in the holder plate 34.

The valve pin 28 is formed with an enlarged threaded head 38 received in a threaded bore 40 in the holder 32, and secured with a set screw 39. This arrangement allows individual axial adjustment of the position of each valve pin 28 by rotating the headed portion 38 in the bore 40, as with a screw driver inserted in an access opening 42 in a clamping plate 44 included in the mold assembly 10.

The clamping plate 44 is bolted together into a stack with a plunger sleeve support plate 46, a spacer plate 48, cavity plate 19, and core plate 21 by means of a series of bolts 50. Tubular spacers 52 are received on the bolts 50 between the clamping plate 34 and plunger sleeve support plate 46 and pass through bores 54 in the holder plate 34. The holder plate 34 thus is able to be raised and lowered in the space between the clamping plate 44 and the support plate 46 by means of a series of hydraulic cylinders 56 mounted to the side of the support plate 46 and space plate 48.

The cylinders 56 each have an upwardly extending piston rod 58 attached to the underside of holder plate 34.

Stops 60 limit the upward travel of the holder plate 34.

Thus, all of the valve pins 28 are moved together to shutoff flow through the gates 24, but are individually adjustable to achieve a proper closure for each.

A flow adjusting plunger sleeve 62 is fit over each valve pin 28, and received in guide bushings 63 having a lowered tapered end 64 adjacent a shoulder 66 in bore 20.

The upper end of the plunger sleeve 62 is formed with a head 68 threaded into a threaded bore 70 in a worm gear 80 disposed within a spacer tube 82 secured between hubs 76 making up the sleeve holder 72. Sleeve holder 72 is held in a bore 74 in the support plate 46 with radial clearance allowing centering alignment of the sleeve 62 and pin 28. Hubs 76 locate the sleeve holder 72 vertically in the support plate 46.

Figure 3:
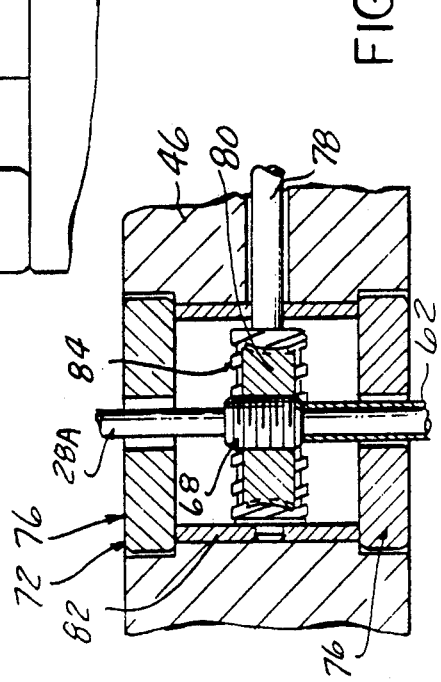
FIG. 3 is an enlarged partially sectional detail showing the worm gear adjustment mechanism rotated 90 degrees from the view in FIG. 2.

In order to rotate the sleeve holder 72 and cause up or down adjustment of the plunger sleeve 62, an adjusting rod 78 extends out of the support plate 46 (FIG. 3) for external access thereto, and has a pinion gear 84 formed thereon in mesh to drive the worm gear 80. The worm gear 80 is axially restrained by the nature of its engagement with pinion gear 84, so that rotation of the worm gear axially shifts the sleeve 62, which in turn advances or retracts the tapered end with respect to the shoulder 66. This adjustment of the sleeve 62 decreases or increases the clearance as seen in the left or right nozzles 22A, 22B respectively in FIG. 2 to vary the restrictive effect. This allows perfect balancing of the flow to each cavity 26.

I claim:

1. An injecting molding apparatus, said apparatus including structure defining a plurality of mold cavities; said apparatus further including an array of injection nozzles, each nozzle having a gate entering into a respective mold cavity;

each injection nozzle having a longitudinal passage communicating with said gate, said mold apparatus including manifold means with runner passages for supplying said longitudinal passage of each injection nozzle with hot melt;

a plurality of parallel, elongated valve pins each extending within the longitudinal passage of a respective nozzle, each valve pin having a tip aligned with a respective gate;

a movable valve pin holder plate;

valve pin mounting means mounting said valve pins to said holder plate to project lengthwise from said holder plate;

actuation means connected to said holder plate for advancing and retracting said holder plate between retracted and fully advanced positions to move the tip of each of said valve pins into a respective gate to cause shut off of flow through each gate or to enable flow through each gate;

said mounting means mounting said valve pins to said holder plate further including adjustment means which enables individual adjustment of the lengthwise position of each of said valve pins, so that lengthwise position of each valve pin may be individually fit to a respective gate to achieve complete flow shutoff when said holder plate is fully advanced;

a plurality of elongated plunger sleeves, each sleeve surrounding a respective valve pin and having a tip portion lying within said longitudinal passage of a respective injection nozzle and located above a respective gate; plunger sleeve mounting means mounting each of said plunger sleeves to be longitudinally fixed within said respective injection nozzle;

adjustment means allowing selective adjustment of the lengthwise position of each of said plunger sleeves in the longitudinal passage of said respective injection nozzle; said longitudinal passage of each injection nozzle including a shoulder adjacent said tip portion of a respective plunger sleeve, said shoulder together with said tip portion defining a variable restriction controlled by the adjusted lengthwise position of said plunger sleeve, whereby flow shutoff can be achieved by operation of said actuation means to move said valve pins into said gates, as well as individual flow adjustment to each valve gate by adjustment of each plunger sleeve.

2. The injection molding apparatus according to claim 1 wherein each of said plunger sleeve mounting means includes a plunger sleeve holder carrying a plunger sleeve, each of said plunger sleeve holders mounted in a respective bore in said apparatus with a radial clearance therebetween and wherein each of said valve pin mounting means includes a valve pin holder carrying a valve pin, each of said valve pin holders mounted in a bore in said apparatus with a radial clearance therebetween, whereby limited lateral movement of both said plunger sleeves and valve pins is allowed to enable self alignment of said plunger sleeves and valve pins in respective longitudinal passages.

3. The injection molding apparatus according to claim 1 wherein said shoulder of said longitudinal passage comprises a tapered shoulder.

4. The injection molding apparatus according to claim 3, wherein the tip of each plunger sleeve is tapered in conformity with said tapered shoulder.

5. The injection molding apparatus according to claim 1 wherein said valve pin mounting means includes a holder held within said holder plate, and said plunger sleeve mounting means includes a holder held within said fixed structure aligned and below said valve pin holder.

6. The injection molding apparatus according to claim 5 wherein each of said holders includes a hollow threaded bore and each of said valve pin and plunger sleeves is formed with a threaded head portion installed in said threaded bore in said associated holder.

7. The injection molding apparatus according to claim 6 wherein said plunger sleeve adjustment means includes gear means for rotating said plunger sleeves in said associated bore.

* * * * *

UNITED STATES PATENT AND TRADEMARK OFFICE
CERTIFICATE OF CORRECTION

PATENT NO. : 5,078,589
DATED : January 7, 1992
INVENTOR(S) : J. M. Osuna-Diaz

It is certified that error appears in the above-identified patent and that said Letters Patent is hereby corrected as shown below:

Column 1, line 63, "the of" should be --of the--.

Column 1, line 68, "with the" should be --with the power--.

Column 2, lines 1-2, "retracted the fully power being advanced or retracted in their respective holders." should be --retracted.--

Column 3, line 42, "gear axially" should be --gear 80 axially--.

Signed and Sealed this

Twenty-first Day of September, 1993

Attest:

BRUCE LEHMAN

*Attesting Officer*   *Commissioner of Patents and Trademarks*